Oct. 18, 1960 G. G. YOUNG 2,956,522
MIXING APPARATUS FOR SEMI-LIQUIDS
Filed Nov. 9, 1959
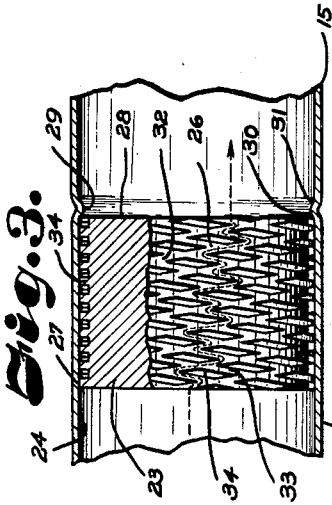
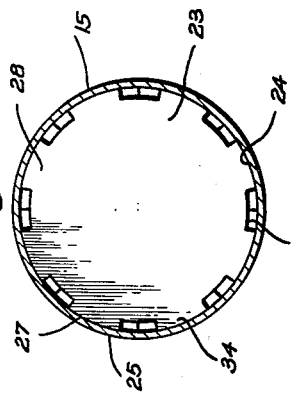
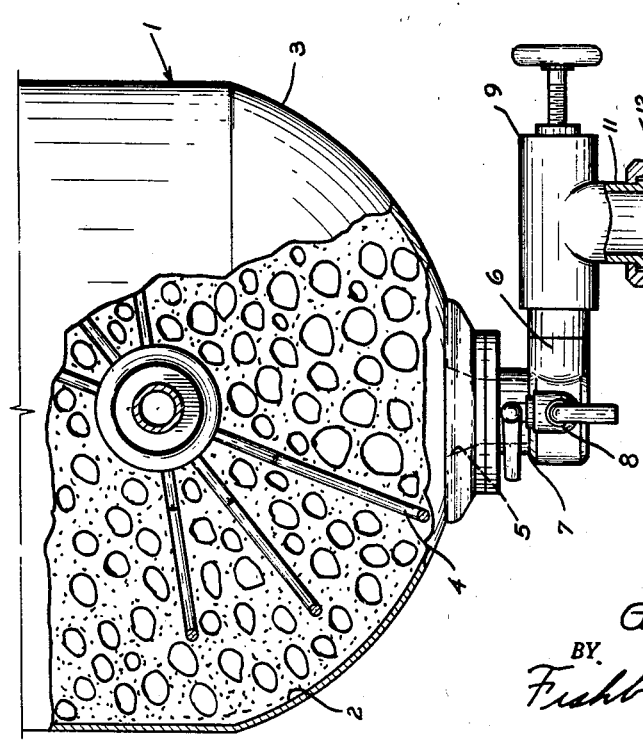
INVENTOR.
George G. Young.
BY
Fishburn and Gold
ATTORNEYS.

United States Patent Office 2,956,522
Patented Oct. 18, 1960

2,956,522
MIXING APPARATUS FOR SEMI-LIQUIDS
George G. Young, 2201 Grand Ave., Kansas City, Mo.
Filed Nov. 9, 1959, Ser. No. 851,903
8 Claims. (Cl. 107—31)

This invention relates to mixing apparatus for use in preparing mixtures especially of solids and liquids, called semi-liquids, under pressure, and particularly for use in preparing mixtures of food ingredients such as mayonnaise, French dressings, meringues, whipped cream and other pourable semi-liquid mixtures of similar viscosity.

The principal objects of the present invention are to provide apparatus for mixing semi-liquids wherein preliminary mixing or whipping is performed in a mixing chamber with air or gas pressure above the contents and the preliminarily mixed contents forced by said pressure through a passage and diffuser therein for finished mixing; to provide such an apparatus for intimately mixing solids and liquids and dispersing air or gas therein; to provide such an apparatus for effective mixing of semi-liquids in greatly reduced time than heretofore required; to provide such an apparatus including a duct with a diffuser therein and having a plurality of small intersecting passages assuring a long path of the fluids therethrough and with stop means in the duct engaged by the diffuser for retaining same in place without materially restricting the discharge from said passages; to provide such an apparatus wherein the diffuser is a plug member slidable into the duct and having a plurality of small closely spaced grooves in the peripheral surface and in angular relation whereby the mixtures are forced along irregular paths formed thereby; and to provide apparatus for mixing semi-liquids that is easily cleaned, that will function to mix various materials in relatively short time and that is efficient in operation in forming an intimate mixture of semi-liquids and in reducing and dispersing air or gas cells therein.

Other objects and advantages of this invention will become apparent from the following description taken in connection with the accompanying drawing, wherein is set forth by way of illustration and example an embodiment of this invention.

Fig. 1 is a partial elevational view of mixing apparatus with portions broken away to illustrate the structure therein.

Fig. 2 is a transverse sectional view through a mixing duct on the line 2—2, Fig. 1.

Fig. 3 is an enlarged longitudinal sectional view through the mixing duct with the diffuser therein partially in elevation and partially in section.

Referring more in detail to the drawing:

1 designates a portion of a mixer or a "whisk" of known kind, such as is illustrated and described in United States Patent No. 2,901,988, issued September 1, 1959, wherein liquid and solid materials or ingredients are delivered to the interior or chamber 2 of a vessel 3 and air or gas introduced above the level of the contents to increase the pressure above atmospheric as desired, and stirrers 4 rotated in the chamber to agitate and mix said ingredients and/or material and incorporate said air or gas therein. The vessel 3 has a bottom discharge opening 5 communicating the chamber 2 with a passage 6 of a drain fitting 7 having a drain valve 8 which may be opened to withdraw a small quantity of the mixture for sampling. A valve 9 is connected to the drain fitting 7 and is operable to control flow from the passage 6 of the drain fitting to a flow duct 10. In the illustrated structure, the valve 9 has a branch 11 connected by a suitable coupling 12 to a thin walled pipe in the form of an L 13, the other end of which is connected by a coupling 14 to one end of a straight thin walled duct or pipe 15, the other end of which is connected by a coupling 16 to a flexible hose 17 preferably having a wall 18 with corrugations 19 therein, as illustrated in Fig. 1. The end of the hose 17 discharges to a nozzle or discharge member 20 having a suitable valve 21 for controlling the discharge of the mixture from the open end 22 of said nozzle.

A diffuser member 23 is mounted in the thin walled pipe or duct 15 to cooperate with the inner surface 24 of the pipe wall 25 in forming a plurality of small diverse passages 26, as later described. In the illustrated structure, the pipe or duct 15 is cylindrical and the diffuser member 23 is a cylindrical plug having a periphery 27 closely engaging the inner surface 24 of the walls of the pipe or duct 15 whereby the diffuser member is slidable in said duct and is retained in desired position by the downstream end 28 engaging an internal rib or stop 29 in the duct. The internal rib 29 has inclined inner side surfaces 30 and 31 arranged substantially in a V in cross-section and is preferably formed by deforming inwardly the wall 25 of the pipe or duct 15, as illustrated in Fig. 3. The inward deformation of the wall is such that the rib extends inwardly from the inner surface 24 a distance substantially less than the depth of the passages 26.

The diffuser member 23, in the illustrated structure, is a cylindrical member which, when placed in the duct of the pipe 15, blocks flow therethrough except for the flow through the passages 26 therein. The passages 26 are preferably formed in the periphery of the diffuser 23 by right-handed and left-handed helical grooves 32 and 33 respectively that are square in cross-section, and, in the illustrated structure, the right-handed helical grooves 32 have greater spacing than the left-handed helical grooves 33, providing a multiplicity of intersecting flow passages 26 separated by webs 34 arranged in staggered relation, said webs being parallelograms in shape. The outer or peripheral surface of the webs 34 engage the inner surface of the duct or pipe 15 and cooperate therewith to define the passages for flow of semi-liquid mixtures therethrough, said semi-liquid being forced through the small passages under pressure, and due to the arrangement of the webs and the intersecting nature of the small passages, the mixture is subjected to extensive mixing and agitation providing the finished mixing of the material being processed. Also, for some material, it may be desirable to have a longer diffuser than that shown in Fig. 3, or a plurality of the members 23 may be arranged in a series one against the other to provide a longer length for the flow of material through the small passages and thereby reduce the cell structure in the mixture. The pressure of material being flowed through the duct 15 holds the diffuser member 23 against the rib 29 adjacent the surface 24 and thereby provides friction that prevents the diffuser member 23 from rotating. Also, the inclined surface 30 of the rib 29 is such that there is substantially no restriction of the discharge of material from the ends of the grooves adjacent said rib.

In using a mixing apparatus constructed as described, suitable quantities of liquid and solid ingredients are introduced into the chamber 2, and the stirrers 4 rotated to provide a preliminary mix as, for example, in whipping cream, cream and sugar are introduced into the chamber 2 in a ratio of six ounces of sugar to one gallon of cream, and then air under pressure is applied to the chamber above the level of the cream as, for example, 20 pounds gauge. However, the air pressure may be varied from 3 to 40 pounds as desired with various materials. The stirrers 4 are then rotated to provide a preliminary mix of the material as, for example, the rotation for such preliminary mix may have a time duration of ½ minute. This rotation of the stirrers not only mixes the cream and sugar but also folds or incorporates air therein in large bubbles, the agitation being of such short duration that the large bubbles are not materially broken up and reduced in size. After the ½ minute of preliminary mixing, the valve 9 is opened whereby the gas pressure in the chamber 2 forces the mixture from the chamber through the opening 5, passage 6, valve 9, branch 11, L 13 and pipe 15, and then through the intersecting passages formed by the grooves 32 and 33 which repeatedly break up the streams and then co-mingle same to thoroughly mix the cream and sugar in a uniform mixture and also reducing and dividing the large air cells to very small air cells which are dispersed in the semi-liquid. The semi-liquid mixture is then forced on through the duct 15 and the corrugated hose 17 where there is some expansion and working as the mixture moves through said corrugated flexible hose before it is discharged through the open end 22 of the nozzle. The entire mixing from the starting of the operation of the stirrers 4 in the chamber 2 to the discharge of the mixed semi-liquid through the open end 22 of the nozzle provides a finished mixing and aeration which may be completed in one minute or less. It has been found that the time of the preliminary mixing by operating of the stirrers in the chamber 2 may be varied, and may be as short as ¼ minute, or may be extended to two minutes or more, if desired. Also, the time for the flow of the preliminary mixed materials from the chamber through the diffuser, hose and the discharge fitting to a point of use will vary, depending upon the volume of the batch in the container 3, the pressure of the gas in the chamber, and the length of the duct and hose to the point of use, but the time for completing the finished mixing of the semi-liquid to form an intimate uniform mixture of the ingredients is very short when compared to operations heretofore required. Also, the structure of the ducts and the diffuser is such that they can be quickly uncoupled and thoroughly cleaned and sterilized.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. Apparatus for use in preparing semi-liquid mixtures comprising, a source of liquid and solid materials stirred together and under gas pressure in the form of a pre-mix, a flow duct having communication with said source of pre-mix whereby said pre-mix is forced through said duct under pressure, stop means extending inwardly in said duct in spaced relation to the upstream end thereof, said stop means having an inclined side surface inclined at an acute angle and in the direction of flow through said duct, a plug member fitting in said duct against said stop means, and a plurality of spaced oppositely directed intersecting grooves in the plug periphery in angular relation to the direction of flow and cooperating with the duct to form small intersecting passages, said grooves being deeper than the height of the stop means whereby said pre-mix forced through the flow duct under pressure is repeatedly separated into small streams and reunited to intensively mix same and divide and disperse contained gas therein and is reunited in the flow passage downstream from the plug in a uniform semi-liquid mixture.

2. Apparatus for use in preparing semi-liquid mixtures comprising, a source of liquid and solid materials stirred together and under gas pressure in the form of a pre-mix, a flow duct having communication with said source of pre-mix whereby said pre-mix is forced through said duct under pressure, an annular rib extending inwardly in said duct in spaced relation to the upstream end thereof, said rib having an inclined side surface inclined at an acute angle and in the direction of flow through said duct, a plug member fitting in said duct and movable longitudinally therein whereby flow therethrough holds said plug against said rib, and a plurality of spaced intersecting grooves in the plug periphery and extending in angular relation to the direction of flow and cooperating with the duct to form small intersecting passages separated by webs, said grooves extending in opposite directions around the periphery of the plug with the spacing of the grooves extending in one direction being different than the spacing of the grooves extending in the other whereby said webs are longer than their width, said grooves being deeper than the height of the annular rib whereby said pre-mix forced through the flow duct under pressure is repeatedly separated into small streams and reunited to intensively mix same and divide and disperse contained gas therein and is reunited in the flow passage downstream from the plug in a uniform semi-liquid mixture.

3. Apparatus for use in preparing semi-liquid mixtures comprising, a source of liquid and solid materials stirred together and under gas pressure in the form of a pre-mix, a flow duct having communication with said source of pre-mix whereby said pre-mix is forced through said duct under pressure, said duct including an elongate thin walled section wherein the thin wall defines a flow passage therethrough that is circular in cross-section, a plug member fitting in said elongate section, means retaining said plug member against longitudinal movement in said section, and a plurality of spaced helical intersecting grooves in the plug periphery and extending generally circumferentially thereon and cooperating with the thin walled section to form small intersecting passages separated by webs, said grooves extending in opposite directions around the periphery of the plug with the spacing of the grooves extending in one direction being different than the spacing of the grooves extending in the other whereby said webs are longer than their width whereby said pre-mix forced through the flow duct under pressure is repeatedly separated into small streams and reunited to intensively mix same and divide and disperse contained gas therein and is reunited in the flow passage downstream from the plug in a uniform semi-liquid mixture.

4. Apparatus for use in preparing semi-liquid mixtures comprising, a mixing chamber for receiving liquid and solid materials and gas to be mixed under pressure, means operable in said mixing chamber for stirring the liquid and solid materials together and incorporating gas therein to form a pre-mix, a flow duct having communication with the mixing chamber at the lower end thereof, valve means adjacent the lower end of the mixing chamber for controlling flow of the pre-mix to said flow duct, a cylindrical section in said flow duct and having a wall defining a flow passage therethrough, a diffuser member in the form of a cylindrical plug fitting in said cylindrical section, means retaining said diffuser member against movement longitudinally in said section, and a plurality of spaced helical grooves in the diffuser member periphery and extending generally circumferentially thereon, said grooves being both right- and left-handed helical grooves cooperating with the wall of the cylindrical section to form small intersecting passages separated by webs staggered one from another, the spacing of the right- and left-handed helical grooves being different whereby said webs are longer than their width, said flow duct extending downstream from the diffuser whereby said pre-mix is forced through the flow duct from the mixing chamber under pressure and is forced through tthe grooves of the diffuser to repeatedly separate said pre-mix into small streams and reunite same to intensively mix same and divide and disperse contained gas therein and is combined in a uniform, semi-liquid mixture downstream from the diffuser.

5. Apparatus for use in preparing semi-liquid mixtures comprising, a mixing chamber for receiving liquid and solid materials and gas to be mixed under pressure, means operable in said mixing chamber for stirring the liquid and solid materials together and incorporating gas therein to form a pre-mix, a flow duct having communication with the mixing chamber at the lower end thereof, valve means adjacent the lower end of the mixing chamber for controlling flow of the pre-mix to said flow duct, a cylindrical section in said flow duct and having a thin wall defining a flow passage therethrough, an inwardly deformed portion in said thin wall defining a V-shaped rib extending inwardly and circumferentially in said flow passage in spaced relation to the ends of said cylindrical section, a diffuser member in the form of a cylindrical plug fitting in said cylindrical section upstream from said rib and moveable longitudinally in said section whereby fluid pressure in the flow duct holds said diffuser engaged with said rib, a plurality of spaced helical grooves in the diffuser member periphery and extending generally circumferentially thereon, said grooves being both right- and left-handed helical grooves cooperating with the wall of the cylindrical section to form small intersecting passages separated by webs staggered one from another, the spacing of the right- and left-handed helical grooves being different whereby said webs are longer than their width, said helical grooves having a depth substantially greater than the circumferential rib for unrestricted flow from the grooves in the diffuser at the end thereof adjacent said rib, and a corrugated flexible hose in said flow duct downstream from the diffuser whereby said pre-mix is forced through the flow duct from the mixing chamber under pressure and is forced through the grooves of the diffuser to repeatedly separate said pre-mix into small streams and reunite same to intensively mix same and divide and disperse contained gas therein and then forced through said flexible hose in a uniform, semi-liquid mixture.

6. An apparatus for use in preparing semi-liquid mixtures comprising, a flow duct for flow of materials to be mixed therethrough under pressure, a section in said flow duct and having a wall defining a flow passage therethrough, a plug fitting in said section, means in said section engaging the plug to retain same in the section, said plug having a plurality of right- and left-handed grooves extending generally around the periphery thereof and cooperating with the wall of said cylindrical section to form small intersecting passages separated by webs staggered one from another whereby materials forced through the flow duct under pressure are repeatedly separated in flowing through the small intersecting passages and reunited to intensively mix same with the mixture combined downstream from the plug in a uniform semi-liquid.

7. An apparatus for use in preparing semi-liquid mixtures comprising, a flow duct for flow of materials to be mixed therethrough under pressure, an elongate cylindrical section in said flow duct and having a wall defining a flow passage therethrough, stop means on said section wall and extending inwardly thereof into the flow passage in said cylindrical section, a cylindrical plug fitting in said cylindrical section upstream from said stop means and movable longitudinally therein whereby fluid flow holds the plug engaged with said stop means, said plug having a plurality of right- and left-handed helical grooves extending generally circumferentially in the periphery thereof and cooperating with the wall of said cylindrical section to form small intersecting passages separated by webs staggered one from another, the spacing of the right- and left-handed helical grooves being different whereby said webs are longer than their width and materials forced through the flow duct under pressure are repeatedly separated in flowing through the small intersecting passages and reunited to intensively mix same with the mixture combined downstream from the plug in a uniform semi-liquid.

8. An apparatus for use in preparing semi-liquid mixtures comprising, a flow duct for flow therethrough under pressure of materials to be mixed, a cylindrical section in said flow duct and having a thin wall defining a flow passage therethrough, said thin wall being deformed inwardly to define a V-shaped rib extending circumferentially of the flow passage in said cylindrical section, and a cylindrical plug fitting in said cylindrical section upstream from said rib and movable longitudinally therein whereby fluid flow holds the plug engaged with said rib, said plug having a plurality of right- and left-handed helical grooves extending generally circumferentially in the periphery thereof and cooperating with the wall of said cylindrical section to form small intersecting passages separated by webs staggered one from another, the spacing of the right- and left-handed helical grooves being different whereby said webs are longer than their width and materials forced through the flow duct under pressure are repeatedly separated in flowing through the small intersecting passages and reunited to intensively mix same with the mixture combined downstream from the plug in a uniform semi-liquid.

References Cited in the file of this patent

UNITED STATES PATENTS

| | | |
|---|---|---|
| 2,424,950 | Alikonis | July 29, 1947 |
| 2,512,471 | Trist | June 20, 1950 |
| 2,817,500 | Robinson | Dec. 24, 1957 |